US012783009B2

(12) United States Patent
Park

(10) Patent No.: US 12,783,009 B2
(45) Date of Patent: *Nov. 3, 2026

(54) WEARABLE DISPLAY DEVICE

(71) Applicant: Samsung Display Co., LTD., Yongin-si (KR)

(72) Inventor: Won Sang Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,202

(22) Filed: Jan. 2, 2025

(65) Prior Publication Data

US 2025/0370502 A1 Dec. 4, 2025

(30) Foreign Application Priority Data

Jun. 3, 2024 (KR) ........................ 10-2024-0072315

(51) Int. Cl.
*G06F 3/01* (2006.01)
*G06F 1/16* (2006.01)
*G06F 3/041* (2006.01)

(52) U.S. Cl.
CPC ............ *G06F 1/163* (2013.01); *G06F 1/1643* (2013.01); *G06F 1/169* (2013.01); *G06F 3/014* (2013.01); *G06F 3/015* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 10,444,834 | B2 | 10/2019 | Vescovi et al. | |
| 11,188,124 | B2 * | 11/2021 | von Badinski | G01P 15/00 |
| 2022/0233142 | A1 | 7/2022 | Hasan et al. | |
| 2023/0325006 | A1 | 10/2023 | Kim et al. | |
| 2025/0375118 | A1 * | 12/2025 | Park | A61B 5/02438 |

FOREIGN PATENT DOCUMENTS

| | | | |
|---|---|---|---|
| JP | 2022049126 | A | 3/2022 |
| KR | 1020240018725 | A | 2/2024 |
| KR | 1020240055185 | A | 4/2024 |
| KR | 1020240055915 | A | 4/2024 |
| WO | 2023182032 | A1 | 9/2023 |

* cited by examiner

*Primary Examiner* — Brian M Butcher
(74) *Attorney, Agent, or Firm* — CANTOR COLBURN LLP

(57) ABSTRACT

A wearable display device includes a housing formed in a ring or cylindrical shape, a display panel which is disposed inside the housing in a ring or cylindrical shape, detects a first light-sensing signal by emitting and receiving light in a first direction and detects a second light-sensing signal by emitting and receiving light in a second direction, and a main driver circuit which detects a user's pulse wave signal using the first light-sensing signal, measures the user's biometric information, and senses movement of a touch by a part of the user's body using the second light-sensing signal.

20 Claims, 13 Drawing Sheets

WEARABLE DISPLAY DEVICE

This application claims priority to Korean Patent Application No. 10-2024-0072315, filed on Jun. 3, 2024, and all the benefits accruing therefrom under 35 U.S.C. § 119, the content of which in its entirety is herein incorporated by reference.

BACKGROUND

1. Field

The disclosure relates to a wearable display device that may measure biometric information such as blood pressure and heart rate.

2. Description of the Related Art

As the information-oriented society evolves, various demands for display devices are ever increasing. Display devices are being employed by a variety of electronic devices such as smart phones, digital cameras, laptop computers, table personal computer ("PCs"), navigation devices, and smart televisions. Portable display devices such as smartphones and tablet PCs may be equipped with a variety of features including image capturing, fingerprint recognition, face recognition, etc.

Recently, as the healthcare industry emerges as an industry with great prospects, methods for acquiring biometric information on health more conveniently are being developed. For example, there is an attempt to apply a traditional oscillometric blood pressure measurement device to a portable blood pressure measurement device. A separate light source, a sensor and a display are desired in such a portable blood pressure measurement device which is carried by a user in addition to a portable smart phone or tablet PC, which is inconvenient.

Recently, efforts are being made to combine portable display devices such as smartphones and tablet PCs with portable blood pressure measurement devices. Besides, there is a desire for a method of measuring various biometric information such as heart rate, heart rate variability, respiration, cardiovascular disease and oxygen saturation in addition to blood pressure using portable display devices such as wearable display devices.

SUMMARY

Features of the disclosure provide a wearable display device that may be worn on a user's body in a ring or cylindrical shape, such as a ring, a bracelet, a watch and a band, and may measure biometric information such as blood pressure, heart rate, and oxygen saturation.

Features of the disclosure also provide a wearable display device that emits lights on both the inner and outer surfaces to sense reflected light from a user's body on the both surfaces, so that the user's biometric information may be detected using the reflected light on the inner surface and the direction in which the user's touch moves may be sensed using the reflected light on the outer surface.

It should be noted that features of the disclosure are not limited to the above-mentioned feature; and other features of the disclosure will be apparent to those skilled in the art from the following descriptions.

In an embodiment of the disclosure, a wearable display device includes a housing formed in a ring shape or a cylindrical shape, a display panel which is disposed inside the housing in a ring shape or a cylindrical shape, detects a first light-sensing signal by emitting and receiving light in a first direction and detects a second light-sensing signal by emitting and receiving light in a second direction, and a main driver circuit which detects a user's pulse wave signal using the first light-sensing signal, measures the user's biometric information, and senses movement of a touch by a part of the user's body using the second light-sensing signal.

In an embodiment of the disclosure, a wearable display device includes a housing formed in a ring shape or a cylindrical shape, a display panel which is disposed inside the housing in a ring shape or a cylindrical shape, detects a first light-sensing signal by emitting and receiving light in a first direction and detects a second light-sensing signal by emitting and receiving light in a second direction, a main driving circuit which detects a user's pulse wave signal using the first light-sensing signal, measures the user's biometric information, and senses movement of a touch by a part of the user's body using the second light-sensing signal, a circuit board having the main driver circuit disposed thereon and electrically connected to the display panel, a sensing circuit disposed on the housing or the circuit board to sense a movement direction of the user and a pressure applied by the user, and a memory which stores and sends the user's pulse wave signals and the user's biometric information.

By the embodiments of the disclosure, a wearable display device may be worn on a user's body in a ring or cylindrical shape like a ring, a bracelet, a watch, or a band, so that it is possible to quickly and accurately measure the user's biometric information such as blood pressure, heart rate and oxygen saturation in real time.

In addition, in the embodiments of the disclosure, a wearable display device may sense the direction in which the user's touch moves by emitting lights on both the inner and outer surfaces to sense reflected lights on the both surfaces, as well as detecting the user's biometric information. Accordingly, the wearable display device may find more applications, such as a direction control device for indicating and changing directions.

It should be noted that effects of the disclosure are not limited to those described above and other effects of the disclosure will be apparent to those skilled in the art from the following descriptions.

BRIEF DESCRIPTION OF THE DRAWINGS

The above and other advantages and features of the disclosure will become more apparent by describing in detail embodiments thereof with reference to the attached drawings, in which.

DETAILED DESCRIPTION

The disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it may be directly on the other layer or substrate, or intervening layers may also be present. The same reference numbers indicate the same components throughout the specification.

It will be understood that, although the terms "first," "second," etc., may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

The term "unit" as used herein is intended to mean a hardware component such as a circuitry that performs a predetermined function. The hardware component may include a field-programmable gate array ("FPGA") or an application-specific integrated circuit ("ASIC"), for example.

Hereinafter, embodiments of the disclosure will be described with reference to the accompanying drawings.

Figure 1:
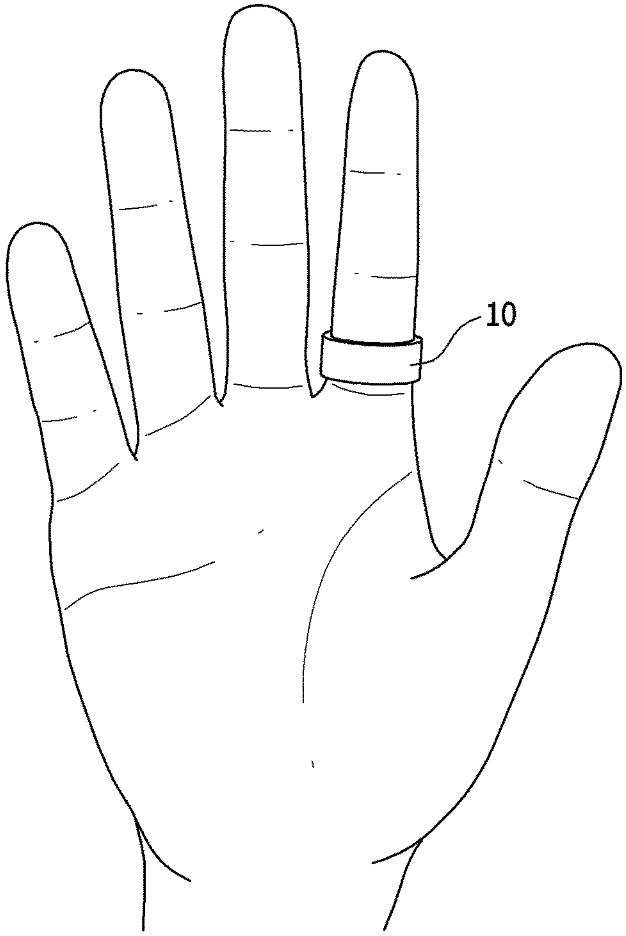
FIG. 1 is a perspective view showing an application embodiment of a wearable display device according to the disclosure.
Figure 2:
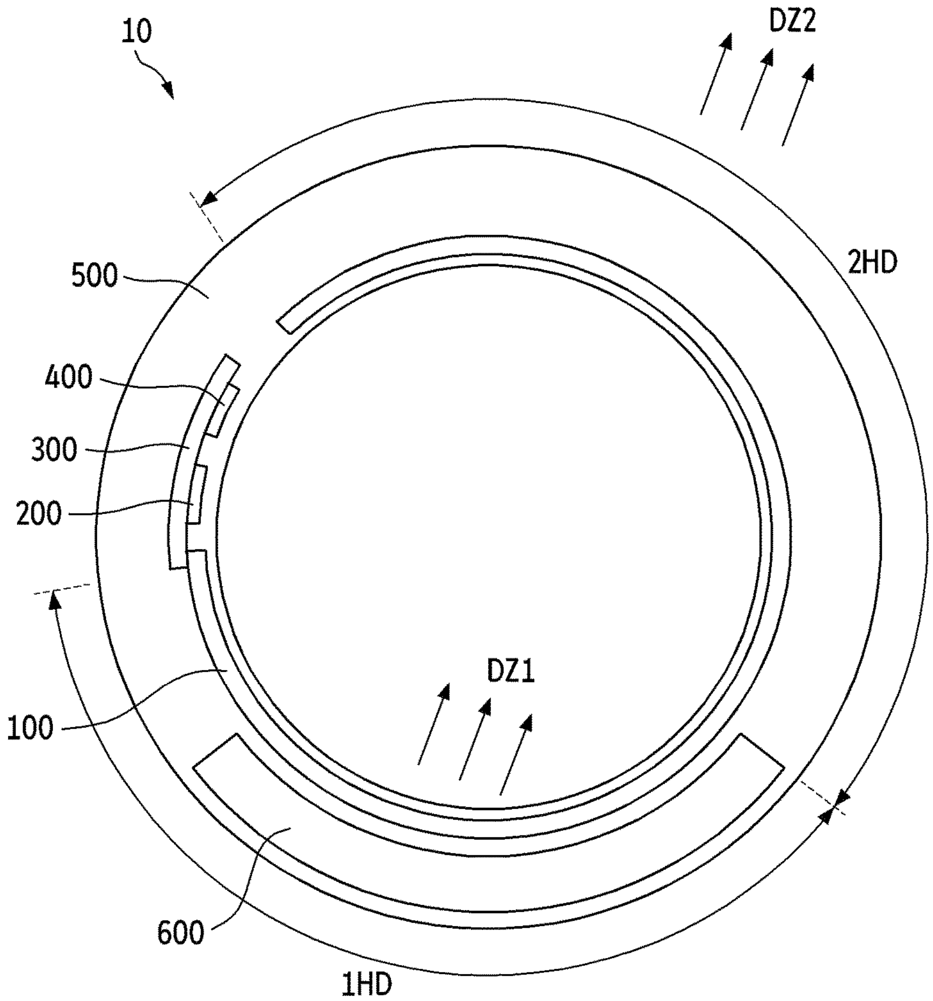
FIG. 2 is a cross-sectional view showing a cross-sectional structure of the wearable display device shown in FIG. 1.

FIG. 1 is a perspective view showing an application embodiment of a wearable display device according to the disclosure. FIG. 2 is a cross-sectional view showing a cross-sectional structure of the wearable display device shown in FIG. 1.

Referring to FIGS. 1 and 2, the wearable display device 10 in the embodiment is a ring or cylindrical type which may be worn on a user's body, like a ring, a bracelet, a smart watch, a band, a watch phone, etc.

The wearable display devices 10 may be divided into different light-emitting display devices such as an organic light-emitting display device using organic light-emitting diodes, a quantum-dot light-emitting display device including quantum-dot light-emitting layer, an inorganic light-emitting display device including an inorganic semiconductor, and a micro-light-emitting diode ("micro-LED") display device using micro or nano light-emitting diodes (micro LEDs or nano LEDs) depending on the emission structure . . . . In the following description, an organic light-emitting structure using an organic light-emitting diode is employed as the light-emitting structure of the wearable display device 10. It should be understood, however, that the embodiments of the disclosure are not limited thereto.

Figure 3:
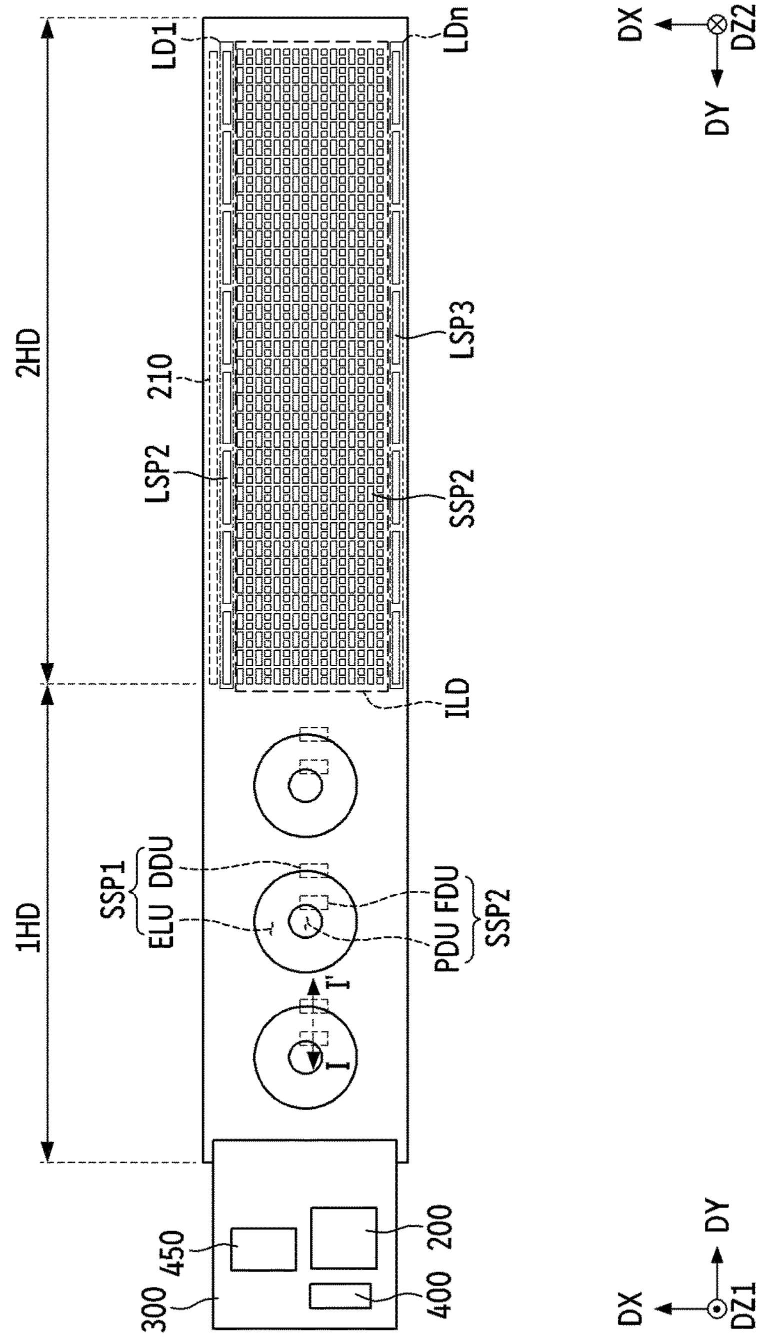
FIG. 3 is a top view showing an embodiment of the display panel shown in FIG. 2 that is spread out.

FIG. 3 is a top view showing an embodiment of the display panel shown in FIG. 2 that is spread out.

Referring to FIGS. 2 and 3, the wearable display device 10 in the embodiment includes a display panel 100, a main driver circuit 200, a scan driver 210, a circuit board 300, a sensing circuit 450, a memory 400, a housing 500, and a battery 600.

The housing 500 is formed in a ring or cylindrical shape that may be applied to a ring, a bracelet, a watch, a band, etc. A plurality of grooves in which the display panel 100, the main driver circuit 200, the circuit board 300, etc., are embedded may be formed on the inner surface and the inside of the housing 500. The housing 500 may include or consist of opaque plastic, rubber, silicone, or metal material. The areas of the housing 500 corresponding to the light-emitting areas or light-receiving areas of the display panel 100 may include or consist of transparent glass or plastic.

The display panel 100 may be disposed in a ring shape or a cylindrical shape inside the housing 500. The display panel 100 may emit light and receive light in a first direction DZ1, i.e., toward the inside of the cylindrical housing 500 to detect a first light-sensing signal according to the amount of light reflected from the user's body. In addition, the display panel 100 may emit light and receive light in a second direction DZ2, i.e., toward the outside of the cylindrical housing 500 to detect a second light-sensing signal according to the amount of light reflected from the user's body.

The main driver circuit 200 may detect a user's pulse wave signal and measure the user's biometric information using the first light-sensing signal of the display panel 100, and may sense the movement of a touch by a part of the user's body using the second light-sensing signal. Specifically, the main driver circuit 200 may receive first light-sensing signals generated in the display panel 100 through light-sensing lines formed in the display panel 100, and may detect photoplethysmography signals, i.e., pulse wave signals, among the biological signals proportional to changes in the magnitude of the first light-sensing signals.

The main driver circuit 200 may analyze pulse wave signals every predetermined period and measure biometric information such as blood pressure, heart rate, heart rate variability, respiratory rate, blood vessel elasticity, cardiovascular disease, and oxygen saturation. The main driver circuit 200 may store the biometric information in the memory 400 and may transmit the biometric information stored in the memory 400 to another mobile display device, etc., through a separate cable, a communication circuit, an antenna, etc. The biometric information measurements such as blood pressure, heart rate, heart rate variability, respiratory rate, vascular elasticity, cardiovascular disease, and oxygen saturation may be displayed as an application program on the screen of the mobile display device.

The main driver circuit 200 may generate electric signals for driving the display panel 100 such as control signals and data voltages. The main driving circuit 200 may be implemented as an integrated circuit ("IC") and may be attached to the display panel 100 or the circuit board 300 by a chip on glass ("COG") technique, a chip on plastic ("COP") technique, or an ultrasonic bonding. It is, however, to be understood that the disclosure is not limited thereto. In an embodiment, the main driver circuit 200 may be attached on the circuit board 300 by the chip-on-film ("COF") technique.

The scan driver 210 sequentially provides gate scan signals to the first and second light-emitting pixels and the first and second light-sensing pixels disposed in the display panel 100, thereby controlling the pixels so that the first and second light-emitting pixels emit lights and the first and second light-sensing pixels receive lights.

The scan driver 210 receives an emission control signal from the main driver circuit 200, and sequentially generates emission scan signals every horizontal line driving period in response to the emission control signal to sequentially provide them to the first and second light-emitting pixels. In other words, the scan driver 210 sequentially controls the emission timing of the first and second light-emitting pixels. In addition, the scan driver 210 may sequentially generate light-sensing scan signals in response to a scan control signal from the main driver circuit 200 and sequentially provide them to the first and second light-sensing pixels. That is to say, the scan driver 210 sequentially controls the light-sensing timing of the first and second light-sensing pixels.

The main driver circuit 200 is disposed (e.g., mounted) on the circuit board 300, and the main driver circuit 200 is electrically connected to the display panel 100 through the circuit board 300. The circuit board 300 may be attached to one end of the display panel 100. Accordingly, the circuit board 300 may be electrically connected to the display panel 100 and the main driver circuit 200. The circuit board 300 may be a flexible printed circuit board, a printed circuit board, or a flexible film such as a chip-on film.

The sensing circuit 450 is disposed in the housing 500 or the circuit board 300 and senses the direction of the user's movement and the pressure applied by the user's finger. To this end, the sensing circuit 450 may include a motion detection sensor such as a gyro sensor and a pressure sensor. The sensing circuit 450 generates a motion detection signal in real time to transmit it to the main driver circuit 200, allowing the main driver circuit 200 to check the user's movement information in real time. In addition, the sensing circuit 450 transmits a pressure detection signal corresponding to a change in pressure applied by the user's finger to the main driving circuit 200.

The memory 400 stores the user's pulse wave signals and the user's biometric information generated in the main driver circuit 200, and allows the user's pulse wave signals and the user's biometric information to be transmitted to other mobile display devices, etc., through a separate cable or a communication circuit, and antenna, etc.

Referring to FIG. 3, the display panel 100 may be divided into a biological signal detection area 1HD and a touch detection area 2HD.

At least one first light-emitting pixel SSP1 and at least one first light-sensing pixel LSP1 are formed and disposed in the biological signal detection area 1HD.

At least one first light-emitting pixel SSP1 emits light in the first direction DZ1, i.e., toward the inside of the display panel 100 disposed in a cylindrical shape, e.g., toward the inside of the cylindrical housing 500. The first light-emitting pixel SSP1 may be defined as a light-emitting pixel that is the minimum unit for emitting light of one of red, green, blue and white. In an embodiment, at least one first light-emitting pixel SSP1 may be formed as a light-emitting pixel that emits green light so that it may be used as a reflected light source for the vein of a finger or a wrist, among other body parts of the user, for example.

At least one first light-emitting pixel SSP1 may include a light-emitting unit ELU that emits light in a first wavelength range, and a pixel driver unit DDU that applies a driving current to a light-emitting element of the light-emitting unit ELU. Herein, the light in the first wavelength range may be light in the green wavelength range. In an embodiment, the main peak wavelength of the light in the first wavelength range may be disposed approximately from 480 nanometers (nm) to 560 nm, for example.

The pixel driver unit DDU applies a driving current to the light-emitting element of the light-emitting unit ELU in response to the data voltage from the main driver circuit 200 and the gate scan signal from the scan driver 210. The light-emitting element of the light-emitting unit ELU emits light in the green wavelength range by the amount of the driving current applied from the pixel driver unit DDU. The light-emitting element of the light-emitting unit ELU may be formed in a circular shape or a polygonal shape, such as a rectangle when viewed from the top, and may surround a light-sensing unit of the first light-sensing pixel LSP1.

At least one first light-sensing pixel LSP1 disposed in the biological signal detection area 1HD receives light reflected from a part of the user's body in the first direction DZ1 and generates a first light-sensing signal based on the amount of received light. The first light-sensing pixel LSP1 may be defined as a light-sensing pixel that is the minimum unit for outputting an electrical signal which varies depending on the amount of received light as a light-sensing signal.

At least one first light-sensing pixel LSP1 includes a light-sensing unit PDU that outputs a light-sensing current proportional to the amount of incident light in the first direction DZ1, and a sensing driver unit FDU that provides a first light-sensing signal proportional to the amount of the light-sensing current from the light-sensing unit PDU to the main driver circuit 200.

The light-sensing unit PDU may include a light-sensing element PD that generates and outputs a light-sensing current proportional to the amount of received light. The light-sensing element PD of the light-sensing unit PDU may be disposed next (adjacent) to the light-emitting unit ELU of the first light-emitting pixel SSP1. The light-sensing element PD may be formed in a circular shape or a polygonal shape, such as a rectangle when viewed from the top and may be formed in a shape surrounded by the light-emitting unit ELU. The light-sensing unit PDU may be formed with a transmittance from 80% to 100% and may detect light in a relatively low brightness or low-illuminance range. To this end, only a transparent protective film or protective cover, etc., may be disposed on the front side of the light-sensing unit PDU. In an embodiment, the relatively low brightness range may be set in advance to the range of 0.0005 candela per square meter (cd/$m^2$) to 0.0001 cd/$m^2$, and the light-sensing unit PDU may be formed with a transmittance from 80% to 100% to detect light in the relatively low brightness range, for example.

The touch detection area 2HD of the display panel 100 includes a light exit area ILD, a first light-sensing area LD1, and the $n^{th}$ light-sensing area LDn.

The light exit area ILD includes at least one second light-emitting pixel SSP2 that emits light in the second direction DZ2, i.e., toward the outside of the cylindrical housing 500. In the light exit area ILD, a plurality of second light-emitting pixels SSP2 may be arranged in vertical or horizontal stripes, or may be arranged the PenTile matrix.

Each of the second light-emitting pixels SSP2 arranged in a matrix in FIG. 3 and the light exit area ILD may emit light toward the outside of the display panel 100 in a cylindrical shape, e.g., in the second direction DZ2 toward the outside of the cylindrical housing 500. Each of the second light-emitting pixels SSP2 may be defined as a light-emitting pixel that is the minimum unit for emitting light of one of red, green, blue and white. In an embodiment, at least one second light-emitting pixel SSP2 may be formed as a light-emitting pixel that emits red or white light, for example, so that it may be used as a reflected light source for the skin of a finger or a palm, among other body parts of the user.

The first light-sensing area LD1 may be disposed on one side of the light exit area ILD. The first light-sensing area LD1 includes a plurality of second light-sensing pixels LSP2 that detects the amount of light reflected from a part of the user's body in the second direction DZ2 and generate a second light-sensing signal based on the detected amount of light. The second light-sensing pixels LSP2 formed in the first light-sensing area LD1 are arranged side-by-side on one side of the light exit area ILD along the longitudinal direction of the display panel 100 and the light exit area ILD.

The $n^{th}$ light-sensing area LDn may be disposed on the opposite side of the light exit area ILD. The first light-sensing area LD1 includes a plurality of third light-sensing pixels LSP3 that detects the amount of light reflected from a part of the user's body in the second direction DZ2 and generate a third light-sensing signal based on the detected amount of light. The plurality of third light-sensing pixels LSP3 formed in the $n^{th}$ light-sensing area LDn are arranged side-by-side on the opposite side of the light exit area ILD along the longitudinal direction of the display panel 100 and the light exit area ILD. Accordingly, the plurality of third light-sensing pixels LSP3 formed in the $n^{th}$ light-sensing area LDn are arranged in parallel with the plurality of second light-sensing pixels LSP2 formed in the first light-sensing area LD1 with the light exit area ILD therebetween.

Figure 4:
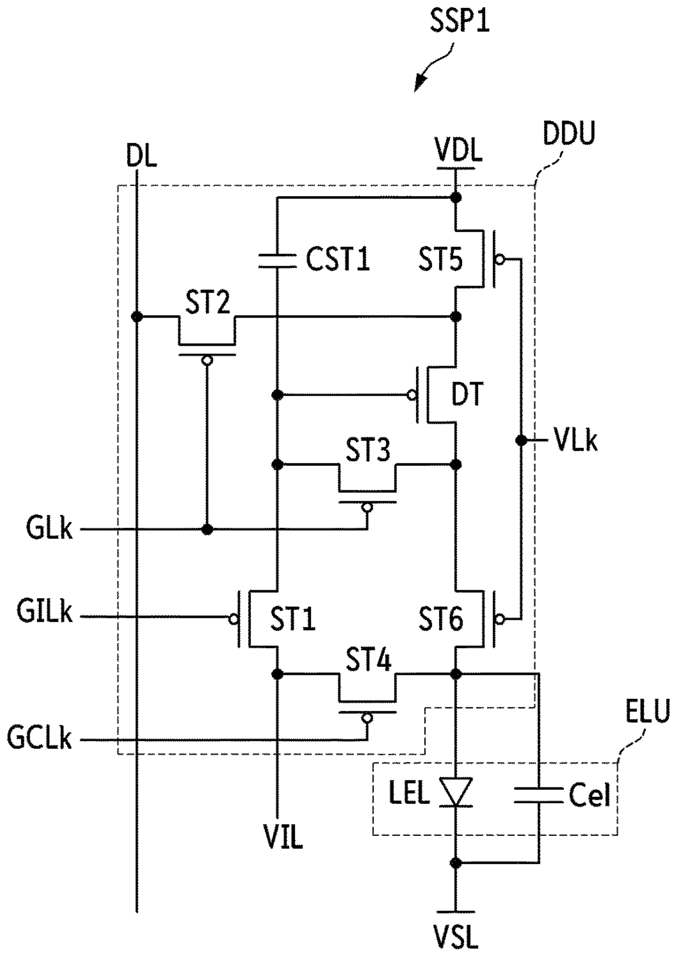
FIG. 4 is a circuit diagram showing a first light-emitting pixel disposed in the biological signal detection area of FIG. 3.

FIG. 4 is a circuit diagram showing a first light-emitting pixel disposed in the biological signal detection area of FIG. 3.

Referring to FIG. 4, each of the first light-emitting pixels SSP1 in the embodiment may be connected to the $k^{th}$ display initialization line GILk, the $k^{th}$ display scan line GLk, and the $k^{th}$ display control line GCLk, and the $k^{th}$ emission control line VLk. Here, k is a natural number. In addition, the first display pixel SP1 may be connected to a first supply voltage line VDL from which a first supply voltage is supplied, a second supply voltage line VSL from which a second supply voltage is supplied, and a third supply voltage line VIL from which a third supply voltage is supplied. In the following description, the letters such as k and n used in place of numbers are defined as positive integers excluding zero.

As described above, the first light-emitting pixel SSP1 may include the light-emitting unit ELU and the pixel driver unit DDU. The light-emitting unit ELU may include a light-emitting element LEL. The pixel driving unit DDU may include a driving transistor DT, switch elements, and a capacitor CST1. The switch elements include first to sixth transistors ST1, ST2, ST3, ST4, ST5 and ST6.

The driving transistor DT may include a gate electrode, a first electrode and a second electrode. A drain-source current Ids (hereinafter also referred to as "driving current") of driving transistor DT flowing between the first electrode and the second electrode is controlled according to the data voltage applied to the gate electrode. The driving current Ids flowing through the channel of the driving transistor DT is proportional to the square of the difference between a voltage Vsg between the first electrode and the gate electrode of the driving transistor DT and the threshold voltage, as shown in Equation 1 below:

$$Ids = k' \times (Vsg - Vth)^2 \quad \text{[Equation 1]}$$

where k' denotes a proportional coefficient determined by the structure and physical properties of the driving transistor, Vsg denotes the voltage between the first electrode and the gate electrode of the driving transistor, and Vth denotes the threshold voltage of the driving transistor.

The light-emitting element LEL emits light as the driving current Ids flows therein. The amount of the light emitted from the light-emitting elements LEL may increase with the driving current Ids.

The light-emitting element LEL may be an organic light-emitting diode including an organic emissive layer disposed between an anode electrode and a cathode electrode. In an alternative embodiment, the light-emitting element LEL may be an inorganic light-emitting element including an inorganic semiconductor disposed between an anode electrode and a cathode electrode. In an alternative embodiment, the light-emitting element LEL may be quantum-dot light-emitting element including a quantum-dot emissive layer disposed between an anode electrode and a cathode electrode. In an alternative embodiment, the light-emitting element LEL may be a micro light-emitting element including a micro light-emitting diode disposed between an anode electrode and a cathode electrode.

The anode electrode of the light-emitting element LEL may be connected to the first electrode of the fourth transistor ST4 and the second electrode of the sixth transistor ST6, while the cathode electrode thereof may be connected to the second supply voltage line VSL. A parasitic capacitance Cel may be formed between the anode electrode and the cathode electrode of the light-emitting element LEL.

The first transistor ST1 is turned on by an initialization scan initialization signal of the $k^{th}$ display initialization line GILk to connect the gate electrode of the driving transistor DT with the third supply voltage line VIL. Accordingly, a third supply voltage VINT1 of the third supply voltage line VIL may be applied to the gate electrode of the driving transistor DT. The gate electrode of the first transistor ST1 may be connected to the $k^{th}$ display initialization line GILk, the first electrode thereof may be connected to the gate electrode of the driving transistor DT, and the second electrode thereof may be connected to the third driving voltage line VIL.

The second transistor ST2 is turned on by the display scan signal of the $k^{th}$ display scan line GLk to connect the first electrode of the driving transistor DT with the data line DL. Accordingly, the data voltage of the data line DL may be applied to the first electrode of the driving transistor DT. The gate electrode of the second transistor ST2 may be connected to the $k^{th}$ display scan line GLk, a first electrode thereof may be connected to the first electrode of the driving transistor DT, and a second electrode thereof may be connected to the data line DL.

The third transistor ST3 is turned on by the display scan signal of the $k^{th}$ display scan line GLk to connect the gate electrode with the second electrode of the driving transistor DT. When the gate electrode and the second electrode of the driving transistor DT are connected with each other, the driving transistor DT works as a diode. A gate electrode of the third transistor ST3 may be connected to the $k^{th}$ display scan line GLk, a first electrode thereof may be connected to the second electrode of the driving transistor DT, and a second electrode thereof may be connected to the gate electrode of the driving transistor DT.

The fourth transistor ST4 is turned on by a display control signal of the $k^{th}$ display control line GCLk to connect the anode electrode of the light-emitting element LEL with the third supply voltage line VIL. The third supply voltage of the third supply voltage line VIL may be applied to the anode electrode of the light-emitting element LEL. The gate electrode of the fourth transistor ST4 may be connected to the $k^{th}$ display control line GCLk, the first electrode thereof may be connected to the anode electrode of the light-emitting element LEL, and the second electrode thereof may be connected to the third supply voltage line VIL.

The fifth transistor ST5 is turned on by the emission signal of a $k^{th}$ emission control line VLk to connect the first electrode of the driving transistor DT with the first supply voltage line VDL. The gate electrode of the fifth transistor ST5 is connected to the $k^{th}$ emission control line VLk, the first electrode thereof is connected to the first supply voltage line VDL, and the second electrode thereof is connected to the first electrode of the driving transistor DT.

The sixth transistor ST6 is disposed between the second electrode of the driving transistor DT and the anode electrode of the light-emitting element LEL. The sixth transistor ST6 is turned on by the emission control signal of the $k^{th}$ emission control line VLk to connect the second electrode of the driving transistor DT with the anode electrode of the light-emitting element LEL. The gate electrode of the sixth transistor ST6 is connected to the $k^{th}$ emission control line VLk, the first electrode thereof is connected to the second electrode of the driving transistor DT, and the second electrode thereof is connected to the anode electrode of the light-emitting element LEL.

When both the fifth transistor ST5 and the sixth transistor ST6 are turned on, the driving current Ids of the driving transistor DT according to the data voltage applied the gate electrode of the driving transistor DT may flow to the light-emitting element LEL.

The capacitor CST1 is formed between the gate electrode of the driving transistor DT and the first supply voltage line VDL. The first capacitor electrode of the capacitor CST1 may be connected to the gate electrode of the driving transistor DT, and the second capacitor electrode thereof may be connected to the first driving voltage line VDL.

When the first electrode of each of the first to sixth transistors ST1, ST2, ST3, ST4, ST5 and ST6 and the driving transistor DT is a source electrode, the second electrode thereof may be a drain electrode. In an alternative embodiment, when the first electrode of each of the first to sixth transistors ST1, ST2, ST3, ST4, ST5 and ST6 and the driving transistor DT is a drain electrode, the second electrode thereof may be a source electrode.

The active layer of each of the first to sixth transistors ST1, ST2, ST3, ST4, ST5 and ST6 and the driving transistor DT may include or consist of one of poly silicon, amorphous silicon and oxide semiconductor. Although the first to sixth transistors ST1, ST2, ST3, ST4, ST5 and ST6 and the driving transistor DT are implemented as p-type metal oxide semiconductor field effect transistors ("MOSFETs") in FIG. 7, this is merely illustrative. They may be implemented as n-type MOSFETs In an embodiment, the first to sixth transistors ST1, ST2, ST3, ST4, ST5 and ST6, and the driving transistor DT may be implemented as n-type MOSFETs, for example. In an alternative embodiment, at least one of the first to sixth transistors ST1, ST2, ST3, ST4, ST5 and ST6 may be implemented as an n-type MOSFET.

Figure 5:
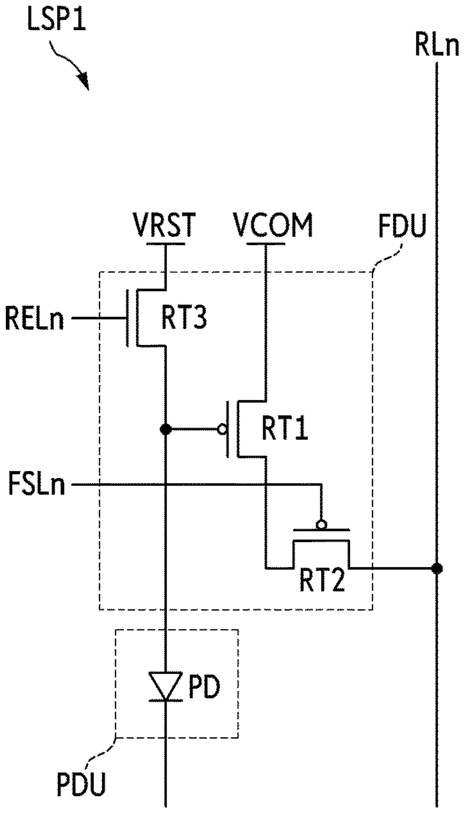
FIG. 5 is a circuit diagram showing a first light-sensing pixel disposed in the biological signal detection area of FIG. 3.

FIG. 5 is a circuit diagram showing a first light-sensing pixel disposed in the biological signal detection area of FIG. 3.

Referring to FIG. 5, the first light-sensing pixel LSP1 is electrically connected to the $n^{th}$ sensing reset line RELn, the $n^{th}$ light-sensing scan line FSLn, and the $n^{th}$ light-sensing line RLn. Here, n is a natural number. Each of the light-sensing pixels LSP (refer to FIG. 12) may be reset by a reset signal from the $n^{th}$ sensing reset line RELn, and may transmit a light-sensing signal to the $n^{th}$ light-sensing line RLn in response to the sensing scan signal from the $n^{th}$ light-sensing scan line FSLn.

The first light-sensing pixels LSP1 may be divided into a photo-detecting unit PDU including a photo-detecting element PD, and a sensing driving unit FDU including first to third sensing transistors RT1 to RT3 and a sensing capacitor (not shown). The sensing capacitor may be formed in parallel with the photo-detecting element PD.

A first sensing transistor RT1 of the sensing driving unit FDU may allow a light-sensing current to flow according to the voltages of the photo-detecting element PD and the sensing capacitor. The amount of current of the light-sensing current may vary depending on a voltage applied to the photo-detecting element PD and the sensing capacitor. The gate electrode of the first sensing transistor RT1 may be connected to the second electrode of the photo-detecting element PD. A first electrode of the first sensing transistor RT1 may be connected to a common voltage source VCOM from which a common voltage is applied. A second electrode of the first sensing transistor RT1 may be connected to a first electrode of the second sensing transistor RT2.

When the sensing scan signal of the gate-on voltage is applied to the $n^{th}$ light-sensing scan line FSLn, the second sensing transistor RT2 allows the sensing current of the first sensing transistor RT1 to flow to the $n^{th}$ light-sensing line RLn. In this instance, the $n^{th}$ light-sensing line RLn may be charged with the sensing voltage by the sensing current. The gate electrode of the second sensing transistor RT2 may be connected to the $n^{th}$ light-sensing scan line FSLn, the first electrode thereof may be connected to the second electrode of the first sensing transistor RT1, and the second electrode thereof may be connected to the $n^{th}$ light-sensing line RLn.

When a reset signal of the gate-on voltage is applied to the $n^{th}$ sensing reset line RELn, the third sensing transistor RT3 may reset the voltages of the photo-detecting element PD and the sensing capacitor to the reset voltage of a reset voltage source VRST. The gate electrode of the third sensing transistor RT3 may be connected to the $n^{th}$ sensing reset line RELn, the first electrode thereof may be connected to the reset voltage source VRST, and the second electrode thereof may be connected to the second electrode of the photo-detecting element PD.

Although the first sensing transistor RT1 and the second sensing transistor RT2 are implemented as p-type metal oxide semiconductor field effect transistors (MOSFETs)

while the third sensing transistor RT3 is implemented as an n-type MOSFET in the example shown in FIG. 5, this is merely illustrative. Optionally, they may be of the same type or different types. In addition, one of the first and second electrodes of each of the first sensing transistor RT1, the second sensing transistor RT2 and the third sensing transistor RT3 may be a source electrode, while a remaining (the other) one may be a drain electrode.

Figure 6:
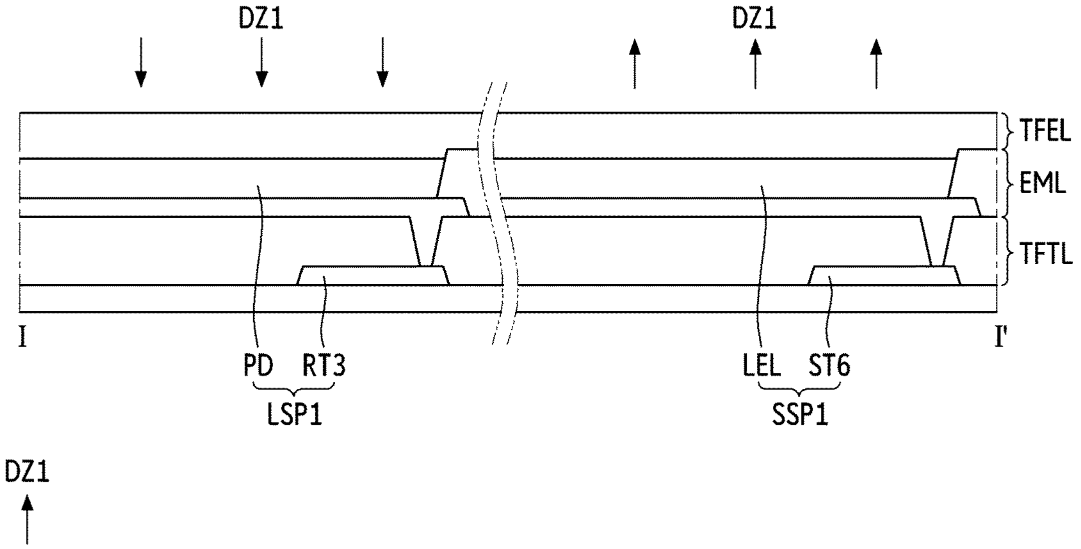
FIG. 6 is a cross-sectional view schematically showing the cross-sectional structure taken along line I-I of FIG. 3.
Figure 7:
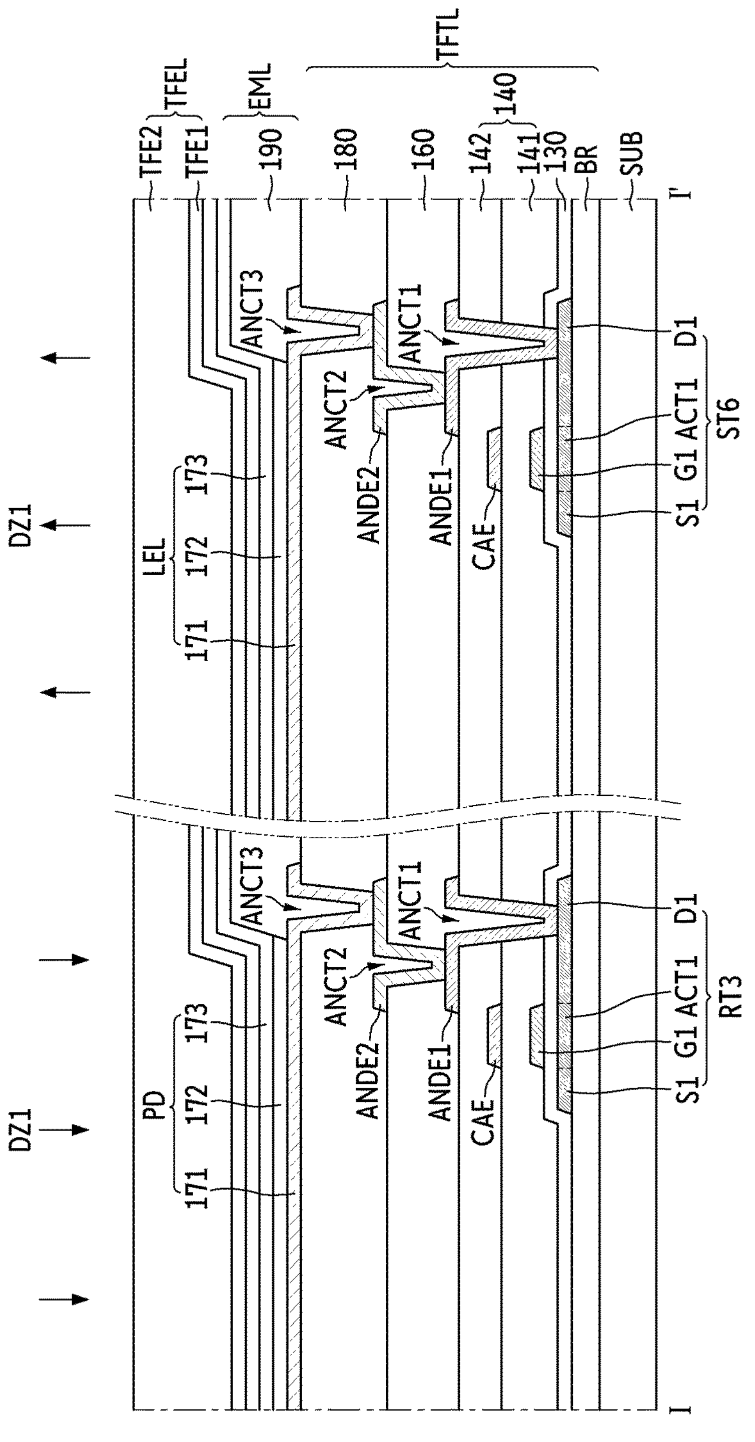
FIG. 7 is a cross-sectional view specifically showing the cross-sectional structure taken along line I-I' of FIG. 6.

FIG. 6 is a cross-sectional view schematically showing the cross-sectional structure taken along line I-I of FIG. 3. FIG. 7 is a cross-sectional view specifically showing the cross-sectional structure taken along line I-I' of FIG. 6.

First, referring to FIGS. 3 and 6, a light-sensing element PD of a light-sensing unit PDU formed in a first light-sensing pixel LSP1 may be formed in a circular shape or a polygonal shape such as a square when viewed from the top, and may be surrounded by a light-emitting unit ELU.

In addition, the light-emitting elements LEL formed in the light-emitting unit ELU of the first light-emitting pixel SSP1 may be formed in a circular shape or a polygonal shape such as a rectangle when viewed from the top, and may surround the light-sensing unit of the first light-sensing pixel LSP1.

Referring to FIGS. 6 and 7, the substrate SUB of the display panel 100 may be a base substrate or a base member. The substrate SUB may be a flexible substrate that may be bent, folded, or rolled. The substrate SUB may include a polymer resin such as polyimide (PI).

The thin-film transistor layer TFTL may be disposed on the substrate SUB. The thin-film transistor layer TFTL may include a plurality of thin-film transistors forming a pixel driver unit DDU of the first light-emitting pixel SSP1 and a sensing driver unit FDU of a first light-sensing pixel LSP1. The thin-film transistor layer TFTL may further include gate lines, data lines, voltage lines, gate control lines, fan-out lines for connecting the main driver circuit 200 with the data lines, lead lines for connecting the main driver circuit 200 with the pads, etc. When the scan driver 210 is formed on one end of the display panel 100, the scan driver 210 may also include thin-film transistors.

The emission material layer EML may be disposed on the thin-film transistor layer TFTL. The emission material layer EML may include a plurality of light-emitting elements in each of which a first electrode, an organic material layer and a second electrode are stacked on one another sequentially to emit light, and a pixel-defining layer for defining an area in which each of light-emitting elements LEL or each of light-sensing elements PD is to be formed.

An encapsulation layer TFEL may cover the upper and side surfaces of the emission material layer EML, and may protect the emission material layer EML. The encapsulation layer TFEL may include at least one inorganic layer and at least one organic layer for encapsulating the emission material layer EML.

Referring to FIG. 7, the barrier layer BR is a film for protecting the transistors of the thin-film transistor layer TFTL and an organic material layer 172 of the emission material layer EML. The barrier layer BR may be made up of multiple inorganic layers stacked on one another alternately.

The thin-film transistor ST6 and RT3, etc., may be disposed on the barrier layer BR. Each of the thin-film transistors ST6 and RT3 includes an active layer ACT1, a gate electrode G1, a source electrode S1 and a drain electrode D1.

The active layer ACT1, the source electrode S1 and the drain electrode D1 of each of the thin-film transistors ST6 and RT3 may be disposed on the barrier layer BR. The active layer ACT1 of each of the thin-film transistors ST6 and RT3 includes polycrystalline silicon, single crystalline silicon, low-temperature polycrystalline silicon, amorphous silicon, or an oxide semiconductor. A part of the active layer ACT1 overlapping the gate electrode G1 in the third direction (z-axis direction) that is the thickness direction of the substrate SUB may be defined as a channel region. The source electrode S1 and the drain electrode D1 are regions that do not overlap with the gate electrode G1 in the third direction (z-axis direction), and may have conductivity by doping ions or impurities into a silicon semiconductor or an oxide semiconductor.

A gate insulator 130 may be disposed on the active layer ACT1, the source electrode S1 and the drain electrode D1 of each of the thin-film transistors ST6 and RT3.

The gate electrode G1 of each of the thin-film transistors ST6 and RT3 may be disposed on the gate insulator 130. The gate electrode G1 may overlap the active layer ACT1 in the third direction (z-axis direction).

A first inter-dielectric layer 141 may be disposed on the gate electrode G1 of each of the thin-film transistors ST1.

A capacitor electrode CAE may be disposed on the first inter-dielectric layer 141. The capacitor electrode CAE may overlap with the gate electrode G1 of each of the thin-film transistors ST6 and RT in the third direction (z-axis direction). Since the first inter-dielectric layer 141 has a predetermined dielectric constant, a capacitor may be formed by the capacitor electrode CAE, the gate electrode G1, and the first inter-dielectric layer 141 disposed between them. A second inter-dielectric layer 142 may be disposed over the capacitor electrode CAE.

A first anode connection electrode ANDE1 may be disposed on the second inter-dielectric layer 142. The first anode connection electrode ANDE1 may be connected to the drain electrode D1 of each of the thin-film transistors ST6 and RT3 through a first connection contact hole ANCT1 that penetrates the gate insulator 130, the first inter-dielectric layer 141 and the second inter-dielectric layer 142. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd) and copper (Cu) or any alloys thereof. A first planarization layer 160 may be disposed over the first anode connection electrode ANDE1 for providing a flat surface over the thin-film transistors ST6 and RT3.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd) and copper (Cu) or any alloys thereof. A second planarization layer 180 may be disposed on the second anode connection electrode ANDE2.

Light-emitting elements LEL, light-sensing elements PD and a pixel-defining layer 190 may be disposed on the second planarization layer 180. In an embodiment, pixel electrode 171 may be connected to the second anode connection electrode ANDE2 through a third connection contact hole ANCT3 which penetrates the second planarization layer 180. Each of the light-emitting elements LEL and the light-sensing elements PD includes a pixel electrode 171, an organic material layer 172, and a common electrode 173. An organic material including or consisting of an organic light-emitting material may be formed in the organic material layer 172 of the light-emitting elements LEL. In the emission area EA of the light-emitting elements LEL, the pixel electrode 171, the organic material layer 172 and the common electrode 173 are stacked on one another sequentially, so that holes from the pixel electrode 171 and electrons from the common electrode 173 are combined with each other in the organic material layer 172 to emit light.

The organic material layer 172 of the light-emitting element LEL formed in the light-emitting unit ELU of the first light-emitting pixel SSP1 may be formed in a circular shape or a polygonal shape such as a rectangle when viewed from the top, and may surround the light-sensing element PD of the first light-sensing pixel LSP1. The organic material layer 172 of the light-sensing element PD formed in the first light-sensing pixel LSP1 may be formed in a circular shape or a polygonal shape such as a rectangle when viewed from the top, and may be surrounded by the light-emitting element LEL.

In the top-emission structure in which light exits from the organic material layer 172 toward the common electrode 173, the pixel electrode 171 may include or consist of a metal material having a relatively high reflectivity such as a stack structure of aluminum and titanium (Ti/Al/Ti), a stack structure of aluminum and indium tin oxide ("ITO") (ITO/Al/ITO), an APC alloy and a stack structure of APC alloy and ITO (ITO/APC/ITO). The APC alloy is an alloy of silver (Ag), palladium (Pd) and copper (Cu).

In the top-emission organic light-emitting diode, the common electrode 173 may include or consist of a transparent conductive material ("TCP") such as ITO and IZO that may transmit light, or a semi-transmissive conductive material such as magnesium (Mg), silver (Ag) and an alloy of magnesium (Mg) and silver (Ag). When the common electrode 173 includes or consists of a semi-transmissive metal material, the light extraction efficiency may be increased by microcavities.

The encapsulation layer TFEL may be disposed on the common electrode 173. The encapsulation layer TFEL includes at least one inorganic layer to prevent permeation of oxygen or moisture into the emission material layer EML. In addition, the encapsulation layer TFEL includes at least one organic layer to protect the emission material layer (also referred to as a light-emitting element layer) EML from foreign substances such as dust. In an embodiment, the encapsulation layer TFEL may include a first inorganic encapsulation layer TFE1 and an organic encapsulation layer TFE2, for example. The first inorganic encapsulation layer TFE1 may be disposed on the common electrode 173, the organic encapsulation layer TFE2 may be disposed on the first inorganic encapsulation layer TFE1, and a second inorganic encapsulation layer may be disposed on the organic encapsulation layer TFE2.

Figure 8:
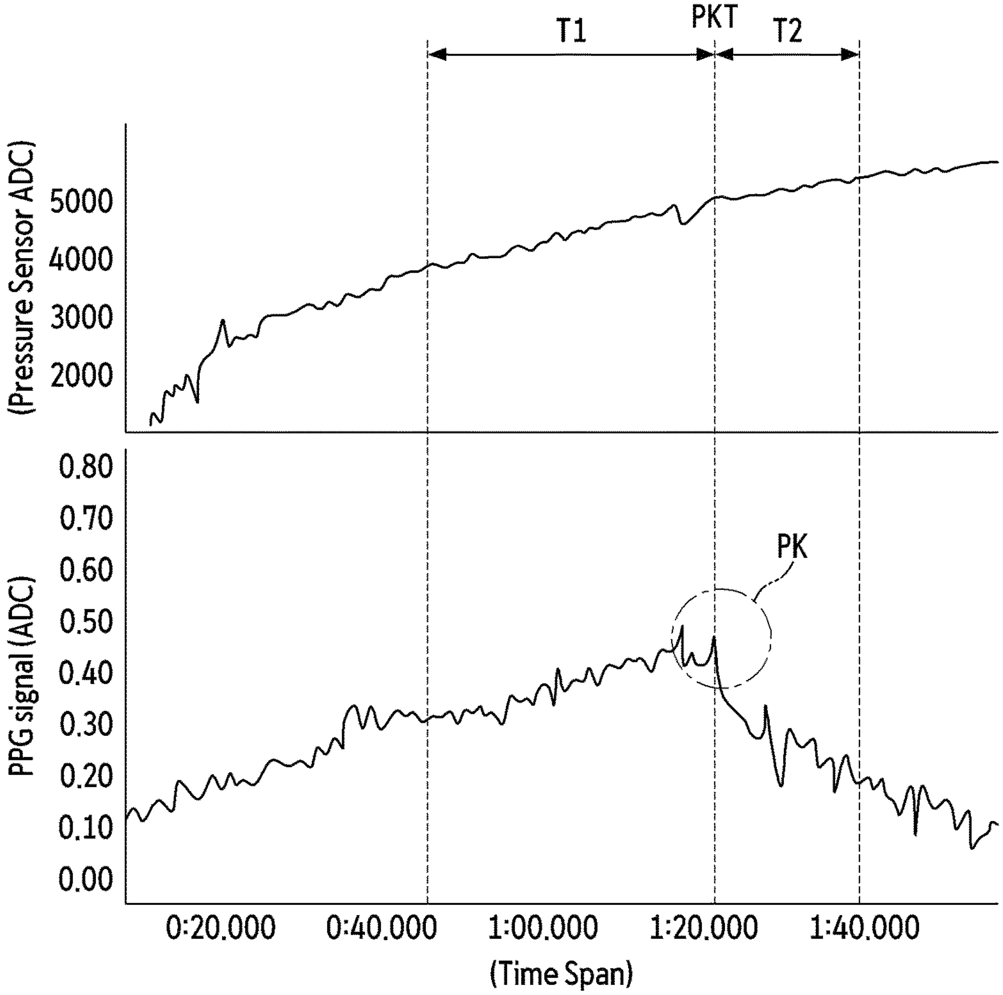
FIG. 8 is a graph for illustrating a method for calculating information about blood pressure among biometric information.

FIG. 8 is a graph for illustrating a method for calculating information about blood pressure among biometric information.

Referring to FIG. 8, the blood ejected from the left ventricle of a heart a systole of a heart moves to the peripheral tissues, and accordingly the blood volume in the artery increases. In addition, red blood cells carry more oxygen in hemoglobin to the peripheral tissues during the systole of the heart. During a diastole of the heart, a part of the blood is sucked from the peripheral tissues towards the heart. When a peripheral blood vessel is irradiated with light, the irradiated light is absorbed by the peripheral tissue. The light absorbance is dependent on the hematocrit ratio and the blood volume. The light absorbance may have the maximum value in the systole of the heart and the minimum value in the diastole of the heart. The light absorbance may have the maximum value in the systole of the heart and the minimum value in the diastole of the heart.

In addition, when the user wears the wearable display device 10 in a blood pressure measurement mode, i.e., when the user brings her/his finger F (refer to FIG. 12) into contact with the biological signal detection area 1HD, the pressure (contact pressure) applied to the pressure sensor of the sensing circuit 450 may gradually increase to reach the maximum value and then may gradually decrease. As the contact pressure increases, the blood vessels may constrict, resulting in relatively small or zero blood flow rate. When the contact pressure decreases, the blood vessels dilate and blood begins to flow again. When the contact pressure further decreases, the blood flow rate increases more. Therefore, a change in the amount of light sensed by the first light-sensing pixel LSP1 may be proportional to a change in blood flow. Accordingly, the main driver circuit 200 generates pulse wave signals PPG according to the pressure applied by the user based on the pressure data value that is calculated by the pressure sensor and digitally converted (ADC of the pressure sensing unit) and the optical signal (PPG signal ratio) according to the amount of light sensed by the light-sensing element PD. The pulse wave signal PPG may have a waveform that oscillates according to heartbeat cycle.

The main driver circuit 200 may estimate blood pressures of the blood vessels of the finger F based on time differences between time points PKT corresponding to the peaks PK of the calculated pulse wave signals PPG and time points corresponding to the peaks of the filtered pulse waves. Specifically, the main driver circuit 200 may calculate pulse wave signals for predetermined time periods T1 and T2 before and after the time points PKT corresponding to the peaks PK of the calculated pulse wave signals and may detect the blood pressure according to differences between the pulse wave signals. Among the estimated blood pressures, the highest blood pressure may be calculated as the systolic blood pressure while the lowest blood pressure may be calculated as the diastolic blood pressure. In addition, other blood pressures such as the average blood pressure may be calculated using the estimated blood pressures.

Figure 9:
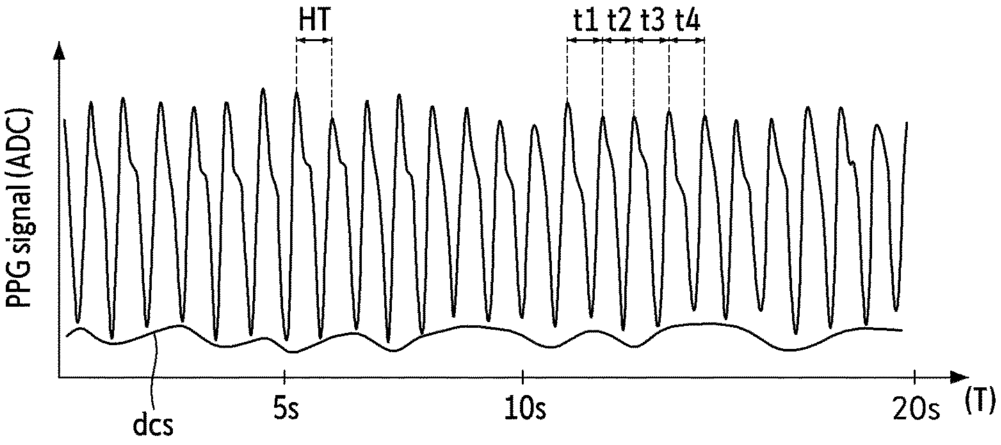
FIG. 9 is a graph for illustrating a method of calculating information about heart rate and respiration among biometric information.

FIG. 9 is a graph for illustrating a method of calculating information about heart rate and respiration among biometric information.

Referring to FIG. 9, the main driver circuit 200 sets the initial value or reference values for the pulse width (e.g., systolic and diastolic period), the amplitude (e.g., systolic blood pressure), the systolic pulse width (e.g., systolic period) and the diastolic period (e.g., diastolic pulse width) for each of the pulse wave signals (PPG). Subsequently, the main driver circuit 200 detects changes in the characteristics of pulse wave signals PPG input in real time compared to the initial values or reference values for the characteristics, i.e., changes in the systolic and diastolic period, the systolic blood pressure, the systolic pulse and the diastolic period, and builds a database with them as learning data. The main driver circuit 200 may output information on the blood pressure BP according to change rate or change size of the characteristics of the pulse wave signals PPG compared to the initial values or reference values of the characteristics.

The above-described method for measuring blood pressure is merely illustrative. A variety of methods may be employed such as ones disclosed in Korean Patent Laid-Open Publication No. 10-2018-0076050, Korean Patent Laid-Open Publication No. 10-2017-0049280 and Korean Patent Laid-Open Publication No. 10-2019-0040527, the entirety of the contents of which are incorporated herein by reference.

The main driver circuit 200 may sample pulse wave signals during a predetermined sampling period before and after the time points PKT corresponding to the peaks PK of the pulse wave signals, and may detect generation period HT of relatively high pulses for the sampled pulse wave signals PPG. In addition, the main driver circuit 200 may count the number of relatively high pulses for each predetermined reference period (e.g., 60 seconds) for the sampled pulse wave signals PPG to detect biometric information about the heart period and heart rate ("HR").

In addition, the main driver circuit 200 detects the heart period HT and heart period changes t1 to t4 of the relatively high pulses for each predetermined reference period for the peaks PK of the pulse wave signals, to detect heart rate variability ("HRV") according to the rate of change of the heart period.

The main driver circuit 200 sequentially detects the generation period of relatively low pulses and the magnitudes of the relatively low pulses for the sampled pulse wave signals PPG. In addition, the main driver circuit 200 may detect the change period of the magnitudes dcs of the relatively low pulses every predetermined reference period (e.g., 60 seconds) to detect changes in the respiration and respiratory rate (RR) of the user. In doing so, the main driver circuit 200 may analyze a period in which the magnitude des of relatively low pulses rises and a period in which the magnitude des of relatively low pulses falls, to detect the changes in the respiration and the respiratory rate (RR) of the user based on the periods in which the magnitude des of relatively low pulses rises and falls.

Figure 10:
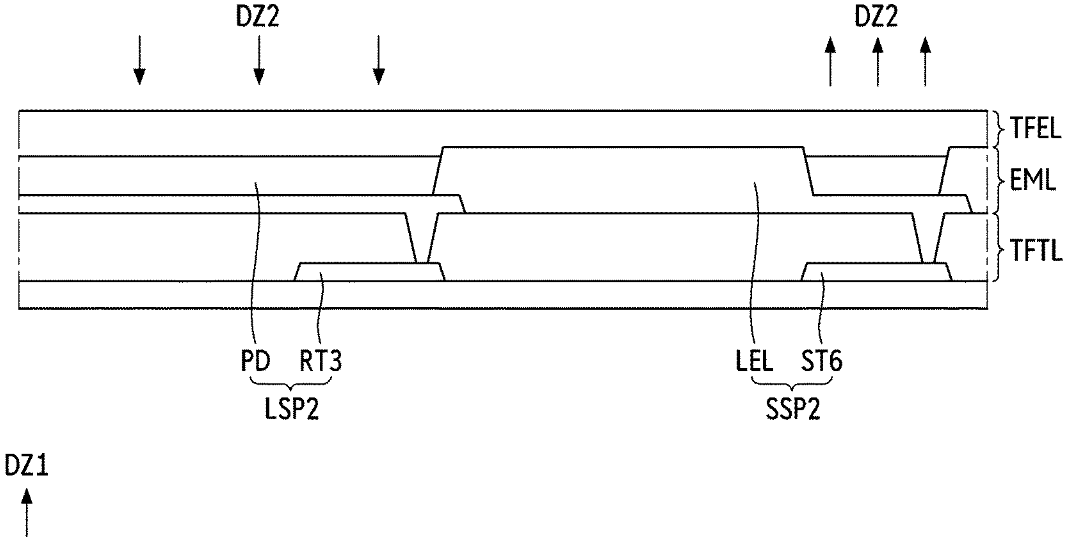
FIG. 10 is a cross-sectional view schematically showing the cross-sectional structure of a second light-emitting pixel and a second light-sensing pixel disposed in the touch detection area of FIG. 3.
Figure 11:
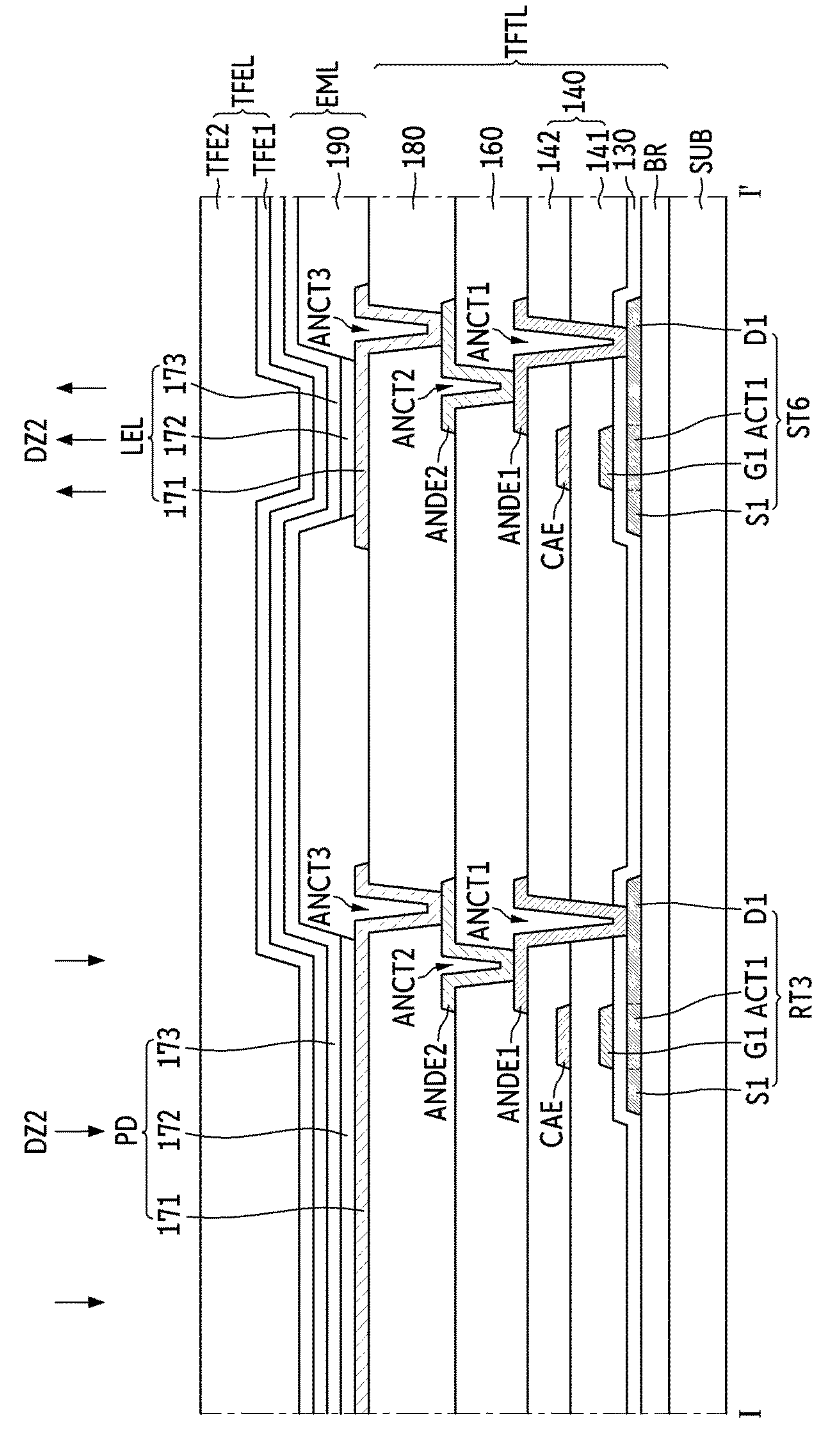
FIG. 11 is a cross-sectional view specifically showing the cross-sectional structure of the second light-emitting pixel and the second light-sensing pixel shown in FIG. 10.

FIG. 10 is a cross-sectional view schematically showing the cross-sectional structure of a second light-emitting pixel and a second light-sensing pixel disposed in the touch detection area of FIG. 3. FIG. 11 is a cross-sectional view specifically showing the cross-sectional structure of the second light-emitting pixel and the second light-sensing pixel shown in FIG. 10.

Referring to FIGS. 10 and 11 in conjunction with FIG. 3, in the touch detection area 2HD of the display panel 100, a plurality of second light-emitting pixels SSP2 is disposed in vertical or horizontal stripes or in the PenTile matrix only in the light exit area ILD. Accordingly, the light-emitting elements of the second light-emitting pixels SSP2 arranged in a matrix in the light exit area ILD emit light toward the outside of the display panel 100 in a cylindrical shape, e.g., in the second direction DZ2 toward the outside of the cylindrical housing 500.

The first light-sensing area LD1 is disposed on one side of the light exit area ILD, and only a plurality of second light-sensing pixels LSP2 is disposed in the first light-sensing area LD1. The light-sensing elements PD formed in the second light-sensing pixels LSP2 detects the amount of light reflected from a part of the user's body in the second direction DZ2 and generate a second light-sensing signal based on the detected amount of light.

Figure 12:
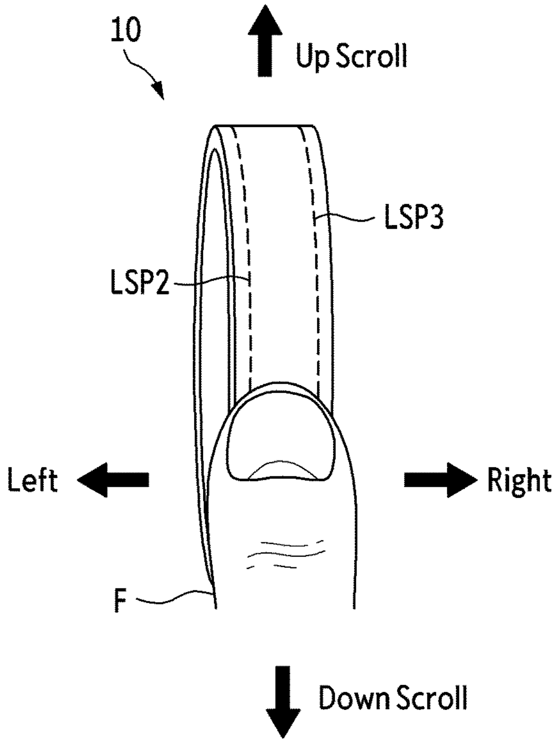
FIG. 12 is a view for illustrating a method for identifying the direction in which a user's touch moves on a wearable display device.

FIG. 12 is a view for illustrating a method for identifying the direction in which a user's touch moves on a wearable display device.

Referring to FIG. 12, the second light-sensing pixels LSP2 formed in the first light-sensing area LD1 (refer to FIG. 3) are arranged side-by-side on one side of the light exit area ILD (refer to FIG. 3) along the longitudinal direction of the display panel 100 and the light exit area ILD.

The third light-sensing pixels LSP3 formed in the $n^{th}$ light-sensing area LDn (refer to FIG. 3) are arranged side-by-side on the opposite side of the light exit area ILD along the longitudinal direction of the display panel 100 and the light exit area ILD. Accordingly, the plurality of third light-sensing pixels LSP3 formed in the $n^{th}$ light-sensing area LDn are arranged in parallel with the plurality of second light-sensing pixels LSP2 formed in the first light-sensing area LD1 with the light exit area ILD therebetween.

The main driver circuit 200 (refer to FIG. 2) receives second light-sensing signals from the second light-sensing pixels LSP2 arranged side-by-side in the first light-sensing area LD1. In addition, the main driver circuit 200 receives third light-sensing signals from the third light-sensing pixels LSP3 formed in the $n^{th}$ light-sensing area LDn.

The main driver circuit 200 determines the direction in which the user's touch moves based on changes in the magnitudes of the second and third light-sensing signals that are sequentially input from the second light-sensing pixels LSP2 formed in the first light-sensing area LD1 and the third light-sensing pixels LSP3 formed in the $n^{th}$ light-sensing area LDn.

Figure 13:
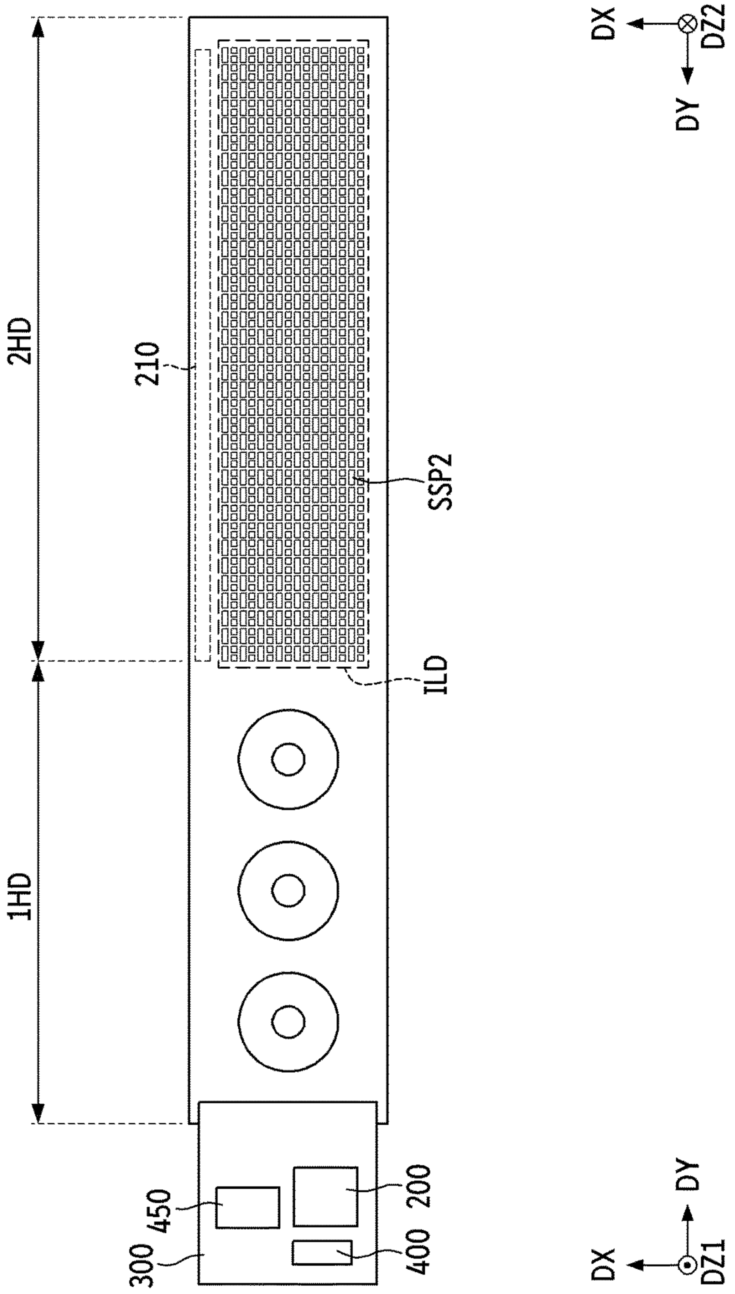
FIG. 13 is a top view showing an embodiment of the display panel shown in FIG. 2 that is spread out.
Figure 14:
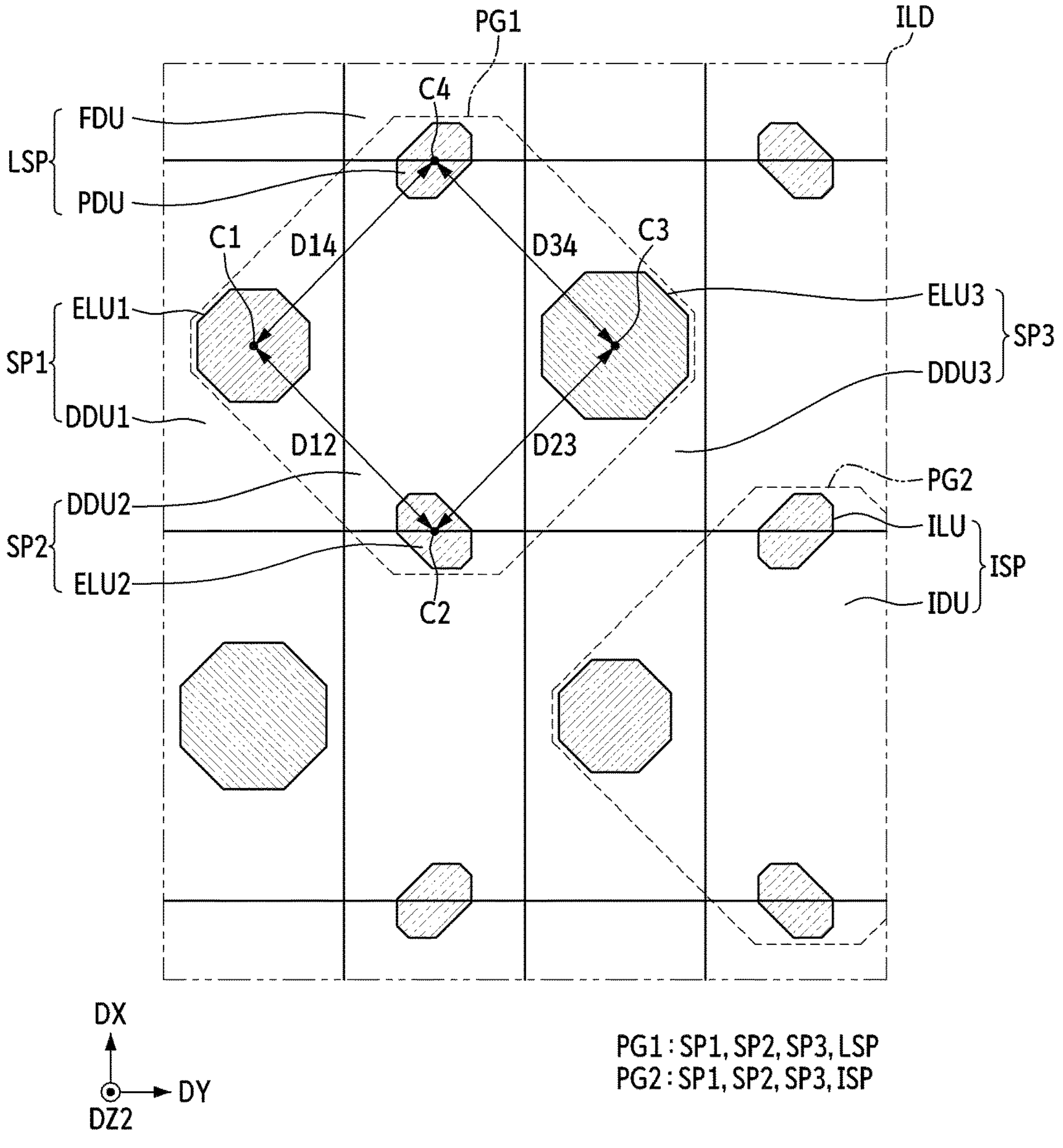
FIG. 14 is a view showing the arrangement structure of second light-emitting pixels and second light-sensing pixels arranged in the touch detection area of FIG. 13.

FIG. 13 is a top view showing an embodiment of the display panel shown in FIG. 2 that is spread out. FIG. 14 is a view showing the arrangement structure of second light-emitting pixels and second light-sensing pixels arranged in the touch detection area of FIG. 13.

Referring to FIGS. 13 and 14, the touch detection area 2HD of the display panel 100 includes a light exit area ILD where first unit pixels PG1 each including a plurality of subsidiary light-emitting pixels SP1, SP2 and SP3 and one light-sensing pixel LSP are arranged.

The subsidiary light-emitting pixels SP1, SP2 and SP3 included in the first unit pixels PG1 of the light exit area ILD emit light toward the outside of the display panel 100 in a cylindrical shape, e.g., in the second direction DZ2 toward the outside of the cylindrical housing 500. The light-sensing pixels LSP included in the unit pixels detect the amount of light reflected from a part of the user's body in the second direction DZ2 and generate a second light-sensing signal based on the detected amount of light.

In addition, the light exit area ILD may further include second unit pixels PG2 each including a plurality of subsidiary light-emitting pixels SP1, SP2 and SP3 and one infrared light-emitting pixel ISP.

The plurality of subsidiary light-emitting pixels SP1, SP2 and SP3 included in the second unit pixels PG2 of the light exit area ILD emit light in the visible wavelength range in the second direction DZ2, toward the outside of the display panel 100 in the cylindrical shape. The infrared light-emitting pixel ISP emits light in the infrared wavelength range.

The first and second unit pixels PG1 and PG2 may be defined as display pixels that are the minimum unit for representing white color. Each of the first unit pixels PG1 may sense reflected light on the front side through light-sensing pixels LSP.

The first unit pixels PG1 and the second unit pixels PG2 are alternately arranged in a zigzag pattern when viewed from the top. They may be arranged in a diagonal direction in a matrix pattern. In addition, the first unit pixels PG1 and the second unit pixels PG2 may be arranged alternately in horizontal or vertical stripes to form a matrix pattern when viewed from the top.

The first subsidiary light-emitting pixel SP1 may include a first light-emitting unit ELU1 that emits first light and a first pixel driving unit DDU1 that applies a driving current to the light-emitting element of the first light-emitting unit ELU1. The first light may be light in a red wavelength range. In an embodiment, the main peak wavelength of the first light may be disposed between approximately 600 nm and 750 nm, for example.

The second subsidiary light-emitting pixel SP2 may include a second light-emitting unit ELU2 that emits second light and a second pixel driving unit DDU2 that applies a driving current to the light-emitting element of the second light-emitting unit ELU2. The second light may be light in a blue wavelength range. In an embodiment, the main peak wavelength of the second light may be disposed between approximately 370 nm and 460 nm, for example.

The third subsidiary light-emitting pixel SP3 may include a third light-emitting unit ELU3 that emits third light and a third pixel driving unit DDU3 that applies a driving current to the light-emitting element of the third light-emitting unit ELU3. The third light may be light in a green wavelength range. In an embodiment, the main peak wavelength of the third light may be disposed between approximately 480 nm and 560 nm, for example.

The light-sensing pixel LSP may include a photo-detecting unit PDU and a sense driving unit FDU.

In the first unit pixel GP1, the first to third pixel driving units DDU1 to DDU3 may be arranged in a predetermined order in the first direction DR1. In an alternative embodiment, one of the first to third pixel driving units DDU1 to DDU3 may be arranged in the first direction DY with another pixel driving unit next (adjacent) thereto. In addition, the sense driving unit FDU may be arranged in the first direction DY of one of the first to third pixel driving units DDU1 to DDU3. In an alternative embodiment, the sense driving unit FDU may be arranged in the second direction DX of one of the first to third pixel driving units DDU1 to DDU3.

The first light-emitting unit ELU1, the second light-emitting unit ELU2, the third light-emitting unit ELU3, the infrared light-emitting unit ILU and the photo-detecting unit PDU may have, but is not limited to, a quadrangular shape, e.g., rectangular shape, an octagonal shape or a diamond shape when viewed from the top. The first light-emitting unit ELU1, the second light-emitting unit ELU2, the third light-emitting unit ELU3, the infrared light-emitting unit ILU and the photo-detecting unit PDU may have other polygonal shapes than a quadrangular shape, e.g., rectangular shape, an octagonal shape or a diamond shape when viewed from the top.

Due to the arrangement positions and planar shapes of the light-emitting unit ELU1, the second light-emitting unit ELU2, the third light-emitting unit ELU3 and the photo-detecting unit PDU, the distance D12 between the center C1 of the first light-emitting unit ELU1 and the center C2 of the second light-emitting unit ELU2, the distance D23 between the center C2 of the second light-emitting unit ELU2 and the center C3 of the third light-emitting unit ELU3, the distance D14 between the center C1 of the first light-emitting unit ELU1 and the center C4 of the second light-emitting unit ELU2, and the distance D34 between the center C4 of the second light-emitting unit ELU2 and the center C3 of the third light-emitting unit ELU3 may be substantially all equal.

The infrared light-emitting pixel ISP included in each of the second unit pixels PG2 may include an infrared light-emitting unit ILU that emits light in the infrared wavelength range, and an infrared pixel driving unit IDU for applying driving current to the light-emitting element of the infrared light-emitting unit ILU. The main peak wavelength of infrared light may lie between approximately 750 nm to 1 millimeter (mm).

The main driver circuit 200 receives light-sensing signals from a plurality of light-sensing pixels LSP arranged in the light exit area ILD.

The main driver circuit 200 determines the direction in which the user's touch moves based on the changes in magnitude of the light-sensing signals sequentially input from the light-sensing pixels LSP arranged in the light exit area ILD and on the direction of the changes.

In concluding the detailed description, those skilled in the art will appreciate that many variations and modifications may be made to the preferred embodiments without substantially departing from the principles of the disclosure. Therefore, the disclosed preferred embodiments of the disclosure are used in a generic and descriptive sense only and not for purposes of limitation.

What is claimed is:

1. A wearable display device which detects a pulse wave signal of a user, the wearable display device comprising:
 a housing formed in a ring shape or a cylindrical shape;
 a display panel which is disposed inside the housing in a ring shape or a cylindrical shape, detects a first light-sensing signal by emitting light in a first direction and receiving light in a first opposite direction opposite to the first direction and detects a second light-sensing signal by emitting in a second direction and receiving light in a second opposite direction opposite to the second direction; and
 a main driver circuit which detects the pulse wave signal of the user using the first light-sensing signal, measures biometric information of the user, and senses movement of a touch by a part of a body of the user using the second light-sensing signal.

2. The wearable display device of claim 1, further comprising:
 a scan driver which provides gate scan signals sequentially to first and second light-emitting pixels and first and second light-sensing pixels arranged in the display panel and controls light-emitting timing of the first and second light-emitting pixels and light-receiving timing of the first and second light-sensing pixels;
 a circuit board on which the main driver circuit is disposed and which is electrically connected to the display panel;
 a sensing circuit disposed on the housing or the circuit board to sense a movement direction of the user and a pressure applied by the user; and
 a memory which stores and sends the pulse wave signal of the user and the biometric information of the user.

3. The wearable display device of claim 1, wherein the display panel comprises:
 a biological signal detection area where at least one first light-emitting pixel that emits light in the first direction and at least one first light-sensing pixel that generates the first light-sensing signal based on an amount of light reflected from the part of the body of the user in the first opposite direction are disposed; and
 a touch detection area where a second light-emitting pixel that emits light in the second direction and a second light-sensing pixel that generates the second light-sensing signal based on an amount of light reflected from the part of the body of the user in the second opposite direction are disposed.

4. The wearable display device of claim 3, wherein the at least one first light-sensing pixel disposed in the biological signal detection area comprises:

a light-sensing unit that outputs a light-sensing current proportional to an amount of incident light in the first opposite direction; and a sensing driver unit that provides the first light-sensing signal corresponding to an amount of the light-sensing current from the light-sensing unit to the main driver circuit, wherein the light-sensing unit comprises a light-sensing element for generating and outputting the light-sensing current proportional to the amount of received light, and wherein the light-sensing element generates the light-sensing current by sensing the incident light in the first opposite direction toward an inside of the display panel in a cylindrical shape.

5. The wearable display device of claim 4, wherein the at least one first light-emitting pixel disposed in the biological signal detection area comprises a light-emitting unit that emits light in a green wavelength range; and a pixel driver unit that applies a driving current to a light-emitting element of the light-emitting unit, wherein the light-emitting unit is formed in a circular or polygonal shape when viewed from top and emits light in the first direction.

6. The wearable display device of claim 5, wherein the light-sensing element is formed in a circular or polygonal shape when viewed from the top and is surrounded by the light-emitting unit, and wherein the light-emitting unit is formed in a circular or polygonal shape when viewed from the top and surrounds the light-sensing element.

7. The wearable display device of claim 3, wherein the second light-sensing pixel is provided in plural, the touch detection area comprises:

a light exit area comprising a second light-emitting pixel that emits light in the second direction, toward an outside of the housing, as opposed to the first direction;

a first light-sensing area disposed on a side of the light exit area and comprising a plurality of second light-sensing pixels that detects an amount of light reflected from the part of the body of the user in the second opposite direction and generates a second light-sensing signal based on to the detected amount of the light; and an $n^{th}$ light-sensing area, where n being a natural number, disposed on an opposite side of the light exit area and comprising a plurality of third light-sensing pixels that detects the amount of the light reflected from the part of the body of the user in the second opposite direction and generates a third light-sensing signal based on to the detected amount of the light.

8. The wearable display device of claim 7, wherein the plurality of second light-sensing pixels formed in the first light-sensing area are arranged side-by-side on the side of the light exit area along a longitudinal direction of the display panel and the light exit area, wherein the plurality of third light-sensing pixels formed in the $n^{th}$ light-sensing area are arranged side-by-side on the opposite side of the light exit area along the longitudinal direction of the display panel and the light exit area, and wherein the plurality of third light-sensing pixels is arranged in parallel with the plurality of second light-sensing pixels with the light exit area therebetween.

9. The wearable display device of claim 3, wherein the touch detection area comprises a light exit area where first unit pixels each comprising a plurality of subsidiary light-emitting pixels and at least one light-sensing pixel are arranged, wherein the plurality of subsidiary light-emitting pixels in each of the first unit pixels emits light in the second direction toward an outside of the display panel in a cylindrical shape, and wherein the at least one light-sensing pixel detects an amount of light reflected from the part of the body of the user in the second opposite direction and generates the second light-sensing signal based on the detected amount of the light.

10. The wearable display device of claim 9, wherein the light exit area of the touch detection area further comprises a second unit pixel comprising a plurality of subsidiary light-emitting pixels and one infrared light-emitting pixel.

11. A wearable display device which detects a pulse wave signal of a user, the wearable display device comprising:

a housing formed in a ring shape or a cylindrical shape;

a display panel which is disposed inside the housing in a ring shape or a cylindrical shape, detects a first light-sensing signal by emitting light in a first direction and receiving light in a first opposite direction opposite to the first direction and detects a second light-sensing signal by emitting in a second direction and receiving light in a second opposite direction opposite to the second direction;

a main driving circuit which detects the pulse wave signal of the user using the first light-sensing signal, measures biometric information of the user, and senses movement of a touch by a part of a body of the user using the second light-sensing signal;

a circuit board on which a main driver circuit is disposed and which is electrically connected to the display panel;

a sensing circuit disposed on the housing or the circuit board to sense a movement direction of the user and a pressure applied by the user; and a memory which stores and sends the pulse wave signal of the user and the biometric information of the user.

12. The wearable display device of claim 11, wherein the display panel comprises:

a biological signal detection area where at least one first light-emitting pixel that emits light in the first direction and at least one first light-sensing pixel that generates the first light-sensing signal based on an amount of light reflected from the part of the body of the user in the first opposite direction are disposed; and a touch detection area where a second light-emitting pixel that emits light in the second direction and a second light-sensing pixel that generates the second light-sensing signal based on an amount of light reflected from the part of the body of the user in the second opposite direction are disposed.

13. The wearable display device of claim 12, wherein the at least one first light-sensing pixel disposed in the biological signal detection area comprises:

a light-sensing unit that outputs a light-sensing current proportional to an amount of incident light in the first opposite direction; and a sensing driver unit that provides the first light-sensing signal corresponding to the amount of the light-sensing current from the light-sensing unit to the main driver circuit, wherein the light-sensing unit comprises a light-sensing element for generating and outputting the light-sensing current proportional to the amount of received light, and wherein the light-sensing element generates the light-sensing current by sensing the incident light in the first opposite direction toward an inside of the display panel in a cylindrical shape.

14. The wearable display device of claim 13, wherein the at least one first light-emitting pixel disposed in the biological signal detection area comprises a light-emitting unit that emits light in a green wavelength range; and a pixel driver unit that applies a driving current to a light-emitting element of the light-emitting unit, wherein the light-emitting unit is formed in a circular or polygonal shape when viewed from top and emits light in the first direction.

15. The wearable display device of claim 14, wherein the light-sensing element is formed in a circular or polygonal shape when viewed from the top and is surrounded by the light-emitting unit, and wherein the light-emitting unit is formed in a circular or polygonal shape when viewed from the top and surrounds the light-sensing element.

16. The wearable display device of claim 12, wherein the second light-sensing pixel is provided in plural, the touch detection area comprises:

a light exit area comprising at least one second light-emitting pixel that emits light in the second direction, toward an outside of the housing, as opposed to the first direction;

a first light-sensing area disposed on a side of the light exit area and comprising a plurality of second light-sensing pixels that detects an amount of light reflected from the part of the body of the user in the second opposite direction and generates a second light-sensing signal based on to the detected amount of the light; and an $n^{th}$ light-sensing area, where n being a natural number, disposed on an opposite side of the light exit area and comprising a plurality of third light-sensing pixels that detects the amount of the light reflected from the part of the body of the user in the second opposite direction and generates a third light-sensing signal based on to the detected amount of the light.

17. The wearable display device of claim 16, wherein the plurality of second light-sensing pixels formed in the first light-sensing area are arranged side-by-side on the side of the light exit area along a longitudinal direction of the display panel and the light exit area, wherein the plurality of third light-sensing pixels formed in the $n^{th}$ light-sensing area are arranged side-by-side on the opposite side of the light exit area along the longitudinal direction of the display panel and the light exit area, and wherein the plurality of third light-sensing pixels is arranged in parallel with the plurality of second light-sensing pixels with the light exit area therebetween.

18. The wearable display device of claim 17, wherein the touch detection area comprises a light exit area where first unit pixels each comprising a plurality of subsidiary light-emitting pixels and at least one light-sensing pixel, and second unit pixels each comprising a plurality of subsidiary light-emitting pixels and one infrared light-emitting pixel are arranged, wherein the plurality of subsidiary light-emitting pixels in each of the first unit pixels emits light in the second direction toward the outside of the display panel in a cylindrical shape, and wherein the at least one light-sensing pixel detects an amount of light reflected from the part of the body of the user in the second opposite direction and generates the second light-sensing signal based on the detected amount of the light.

19. An electronic device including a wearable display device which detects a pulse wave signal of a user, wherein the wearable display device comprising:

a housing formed in a ring shape or a cylindrical shape;

a display panel which is disposed inside the housing in a ring shape or a cylindrical shape, detects a first light-sensing signal by emitting light in a first direction and receiving light in a first opposite direction opposite to the first direction and detects a second light-sensing signal by emitting light in a second direction and receiving light in a second opposite direction opposite to the second direction; and a main driver circuit which detects the pulse wave signal of the user using the first light-sensing signal, measures biometric information of the user, and senses movement of a touch by a part of a body of the user using the second light-sensing signal.

20. The electronic device of claim 19, the wearable display device further comprising:

a scan driver which provides gate scan signals sequentially to first and second light-emitting pixels and first and second light-sensing pixels arranged in the display panel and controls light-emitting timing of the first and second light-emitting pixels and light-receiving timing of the first and second light-sensing pixels;

a circuit board on which the main driver circuit is disposed and which is electrically connected to the display panel;

a sensing circuit disposed on the housing or the circuit board to sense a movement direction of the user and a pressure applied by the user; and a memory which stores and sends the pulse wave signal of the user and the biometric information of the user.

* * * * *